(12) United States Patent
Zyman Beer et al.

(10) Patent No.: US 8,716,610 B2
(45) Date of Patent: May 6, 2014

(54) ELASTIC HANDLE INTEGRATED LUGGAGE SCALE

(76) Inventors: Jacobo Zyman Beer, Mexico City (MX); Alex Zyman, San Diego, CA (US)

( * ) Notice: Subject to any disclaimer, the term of this patent is extended or adjusted under 35 U.S.C. 154(b) by 261 days.

(21) Appl. No.: 13/309,785

(22) Filed: Dec. 2, 2011

(65) Prior Publication Data

US 2013/0140097 A1    Jun. 6, 2013

(51) Int. Cl.
*G01G 19/58* (2006.01)
(52) U.S. Cl.
USPC ............................ 177/148; 177/145; 116/215
(58) Field of Classification Search
USPC ........ 177/25.13, 45, 126, 127, 131, 132, 148, 177/156, 211, 245; 116/215
See application file for complete search history.

(56) References Cited

U.S. PATENT DOCUMENTS

| | | | | |
|---|---|---|---|---|
| 4,969,644 A * | 11/1990 | Hlaing | ........................... | 482/126 |
| 5,319,162 A * | 6/1994 | Ness | ............................ | 177/231 |
| 5,416,279 A * | 5/1995 | Tseng | ........................... | 177/132 |
| 5,996,180 A * | 12/1999 | Eisenzopf | ....................... | 16/406 |
| 7,156,918 B2 * | 1/2007 | Marks | ........................... | 177/168 |
| 7,281,615 B2 * | 10/2007 | Siwak et al. | .................... | 190/39 |
| 7,282,653 B2 * | 10/2007 | Marks | ........................... | 177/126 |
| 8,485,329 B1 * | 7/2013 | Roy et al. | ...................... | 190/116 |
| 2002/0129628 A1 * | 9/2002 | Skalberg | ........................... | 70/18 |
| 2007/0056779 A1 * | 3/2007 | Laniado et al. | ............... | 177/245 |
| 2007/0261213 A1 * | 11/2007 | Nolan et al. | .................... | 24/300 |
| 2008/0011568 A1 * | 1/2008 | Siwak et al. | .................. | 190/115 |
| 2008/0072404 A1 * | 3/2008 | Wetter | ........................ | 24/68 R |
| 2008/0185409 A1 * | 8/2008 | Kellenberger | ................ | 224/257 |
| 2010/0116559 A1 * | 5/2010 | Moon | ........................ | 177/25.13 |
| 2010/0181354 A1 * | 7/2010 | Laniado | ........................ | 224/259 |

FOREIGN PATENT DOCUMENTS

| | | |
|---|---|---|
| WO | 03-100360 | 12/2003 |
| WO | 2005-092676 | 10/2005 |
| WO | 2011-048518 | 4/2011 |

OTHER PUBLICATIONS

International Search Report Dated Mar. 19, 2013, 10 pages.

* cited by examiner

*Primary Examiner* — Randy W Gibson
*Assistant Examiner* — Natalie Huls
(74) *Attorney, Agent, or Firm* — ARC IP Law, PC; Joseph J. Mayo

(57) ABSTRACT

A handle integrated scale configured to fixedly attach to a liftable element that allows a user to ascertain the weight of said liftable element based on the amount of force exerted onto the handle integrated scale from the liftable element as it is lifted.

19 Claims, 5 Drawing Sheets

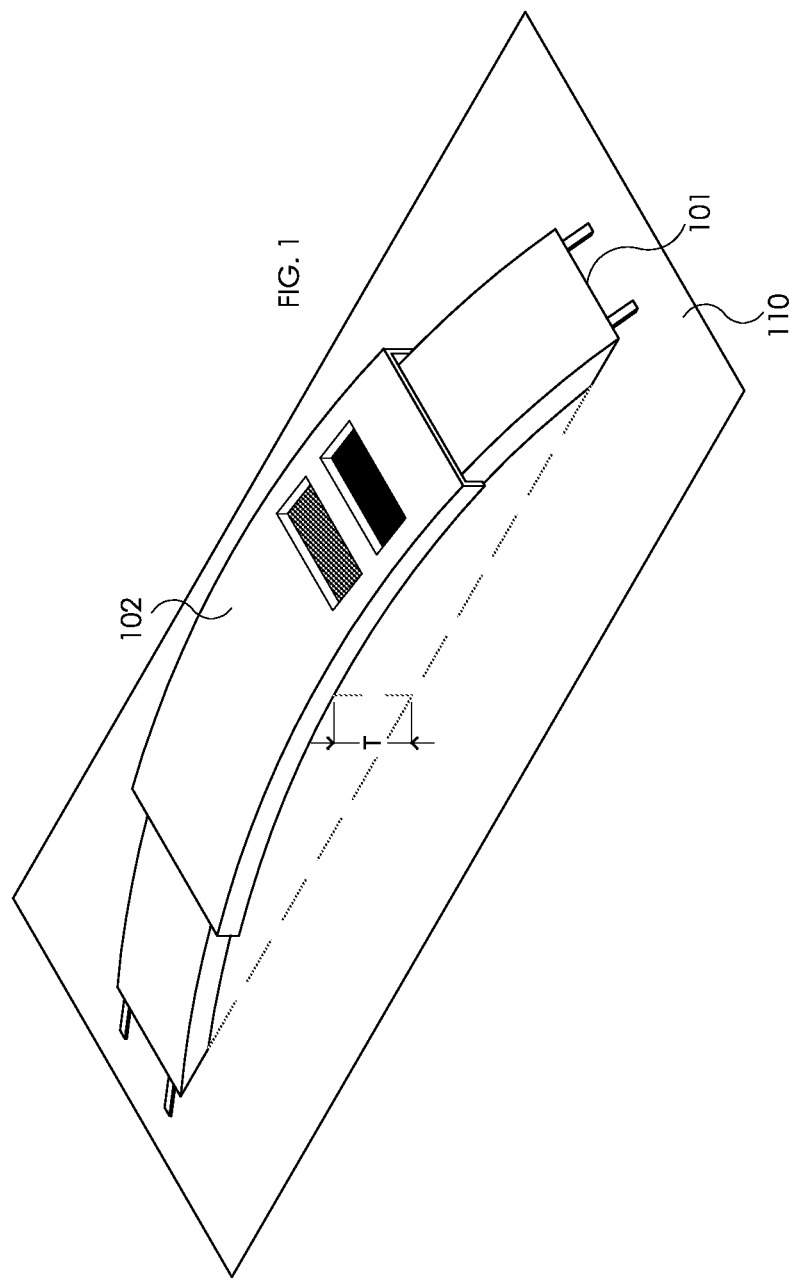

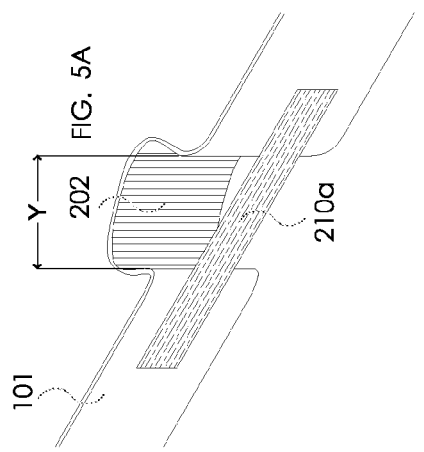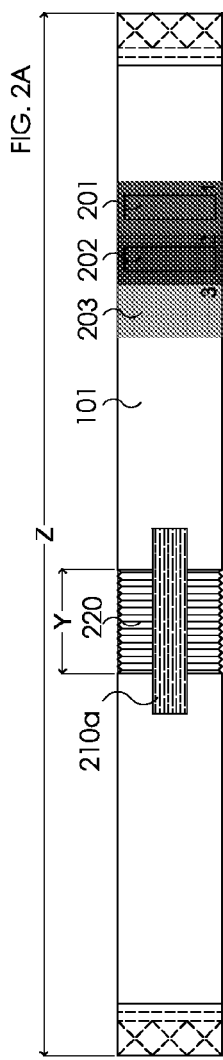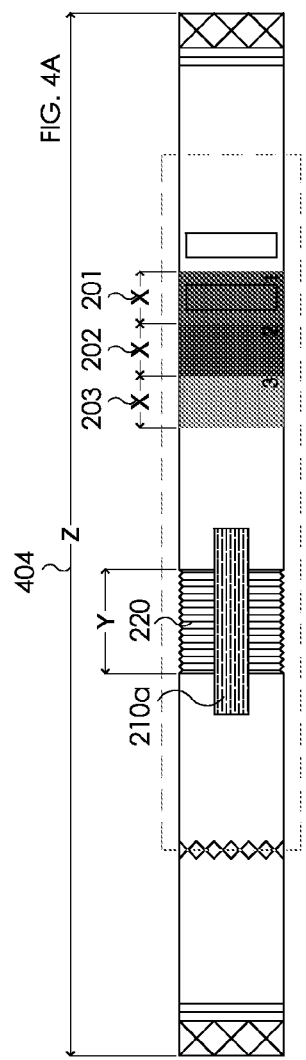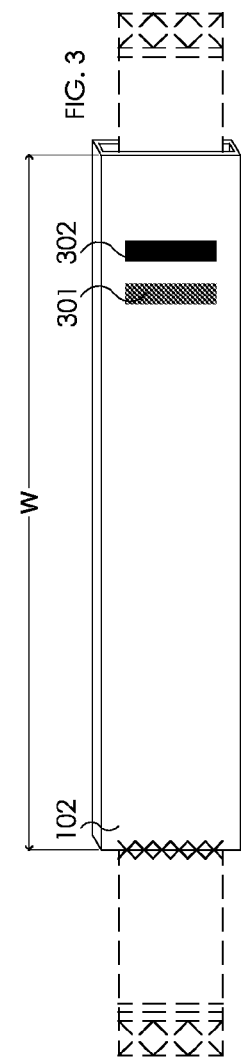

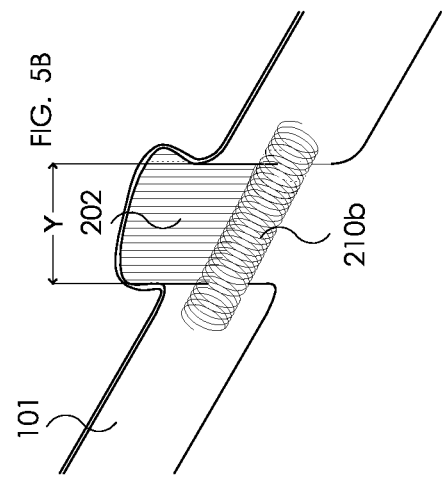
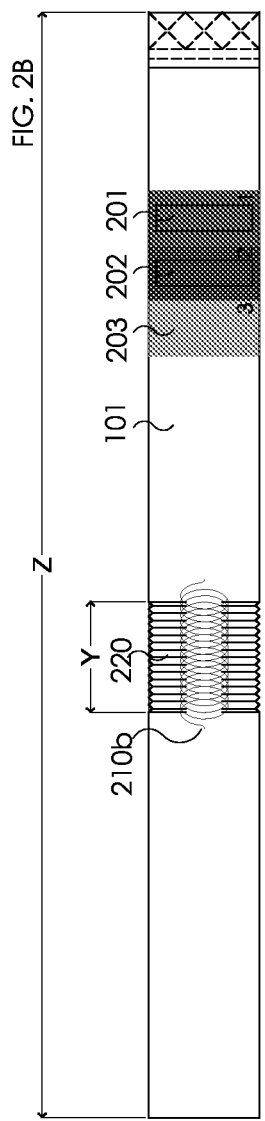
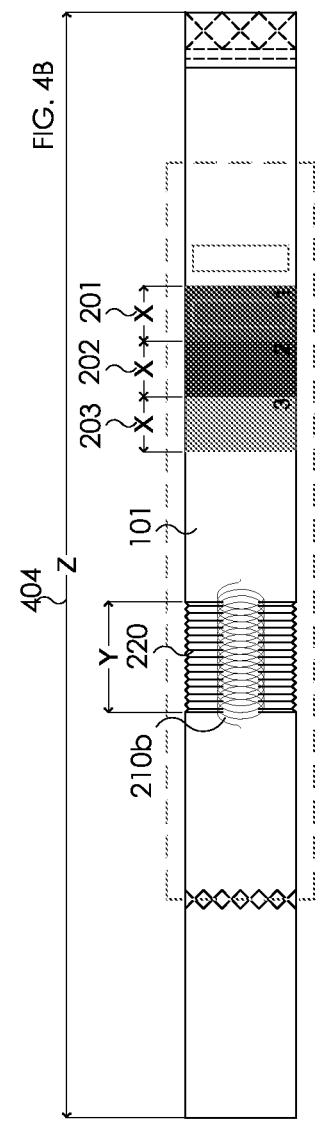

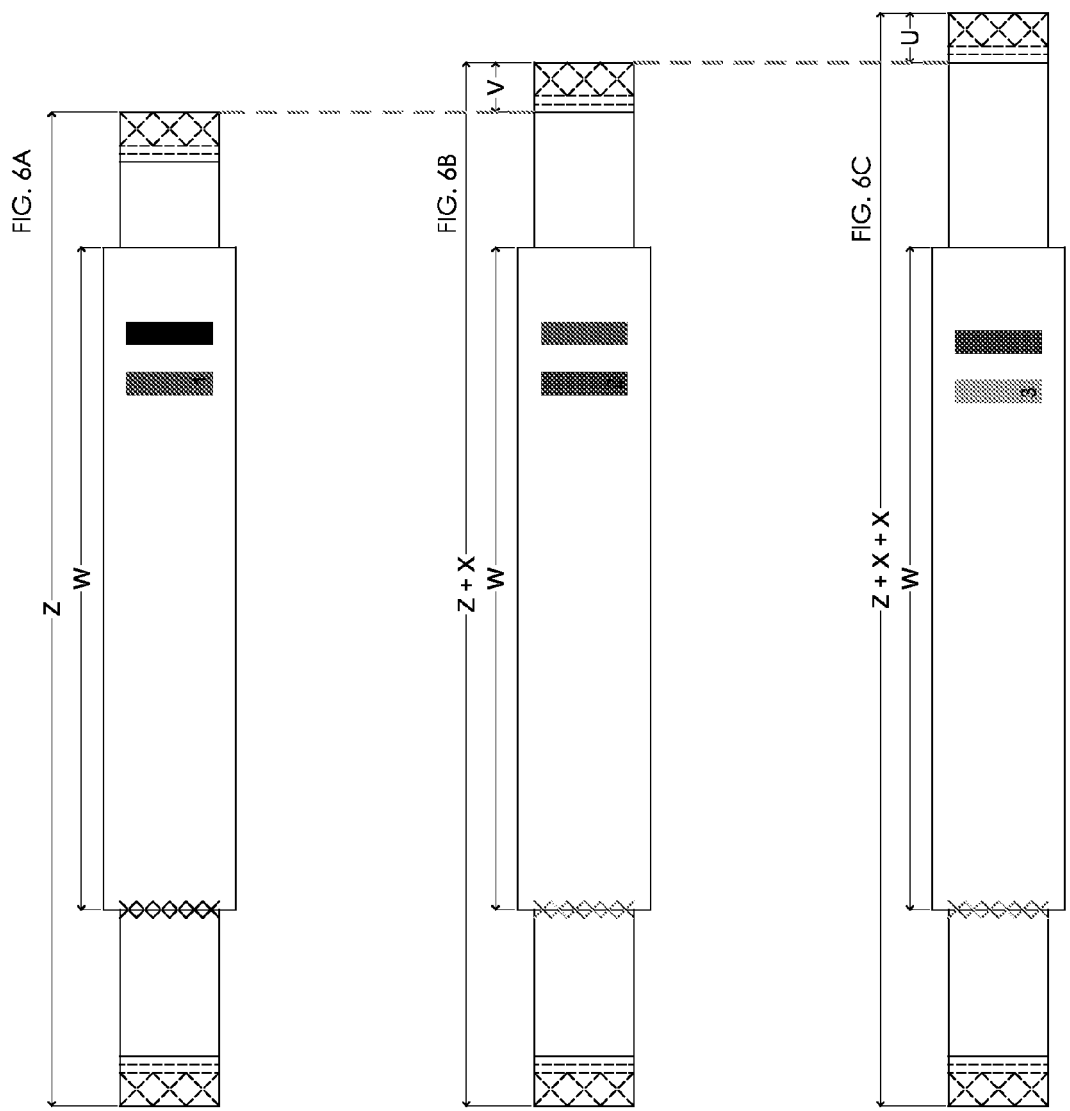

ELASTIC HANDLE INTEGRATED LUGGAGE SCALE

BACKGROUND OF THE INVENTION

1. Field of the Invention

One or more embodiments setting forth the ideas described throughout this disclosure pertain to the field of weight measurement devices. More particularly, but not by way of limitation, one or more aspects of the disclosure enable a handle integrated scale.

2. Description of the Related Art

There currently exist several types of scales that can measure the weight of objects. Some require the object to be placed on the scale and others require the scale to be affixed to the object. Other scales are attached to liftable elements that can be filled with whatever is to be weighed. Still others can be attached and unattached. Many of these types of systems are either difficult to use or are not convenient for everyday use. Individuals have continuing concerns about the weight of the objects they may be carrying, whether due to weight restrictions enforced at an airport for a flight or a person not wanting to overstress carrying too heavy of an object, and there needs to be an easy and reliable way to measure the weight of these objects without having to look for a scale or having to find it and then attach it to the object. In addition, certain scales are digital and rely on a properly working battery. A handle integrated scale allows a user to be aware and able to modify the weight of whatever is attached to the scale and allow them the flexibility to make these changes at any moment they deem necessary.

For at least the limitations described above there is a need for a handle integrated scale.

BRIEF SUMMARY OF THE INVENTION

At a high-level the disclosure set forth herein is directed to a handle integrated scale. Utilizing this system enables a user to weigh an object that is attached to the handle integrated scale by measuring the force exerted on the scale as it is lifted by the handle.

The handle integrated scale is meant to provide the user with a convenient means of weighing an object without the need to attach a separate weighing device. As a result of the scale being handle integrated, the user may assess the weight at any moment. As in the case with personal luggage, one may not have access to a scale when it is necessary, such as on vacation. Because of the stringent weight limits set on items like, but not limited to, personal luggage, one must be able to weigh one's own items.

The handle integrated scale may be fixedly attached to any object that requires knowledge of its weight. The handle integrated scale may be fixedly attached at the natural spot where a traditional handle would be attached. In addition to adding the convenience of allowing weight measurements, the handle integrated scale will allow the user to carry and transport the object more easily.

There are however various approaches for implementing such a system and its related methods are elaborated on throughout this disclosure. One such approach involves a handle integrated scale coupled to a liftable element at two ends that will display the force exerted onto the scale by the liftable element.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

FIG. 1 illustrates a perspective view of a handle integrated scale.

FIG. 2A illustrates a top view of a handle integrated scale that includes an elastic force detector shown without a gauge.

FIG. 2B illustrates a top view of a handle integrated scale that includes a spring coiled force detector shown without a gauge.

FIG. 3 illustrates a top view of a handle integrated scale shown with a gauge.

FIG. 4A illustrates a top view of a handle integrated scale shown with an outline of where the gauge would be placed in relation to said hand integrated scale that includes an elastic force detector.

FIG. 4B illustrates a top view of a handle integrated scale shown with an outline of where the gauge would be placed in relation to said hand integrated scale that includes a spring coiled force detector.

FIG. 5A illustrates a perspective view of a handle integrated scale shown with the slack in relation to the elastic force detector.

FIG. 5B illustrates a perspective view of a handle integrated scale shown with the slack in relation to the spring coiled force detector.

FIGS. 6A, 6B and 6C illustrate a top view of a handle integrated scale shown with the gauge placed in three different positions based on the position of the force indictor relative to the gauge.

DETAILED DESCRIPTION

Figure 7:
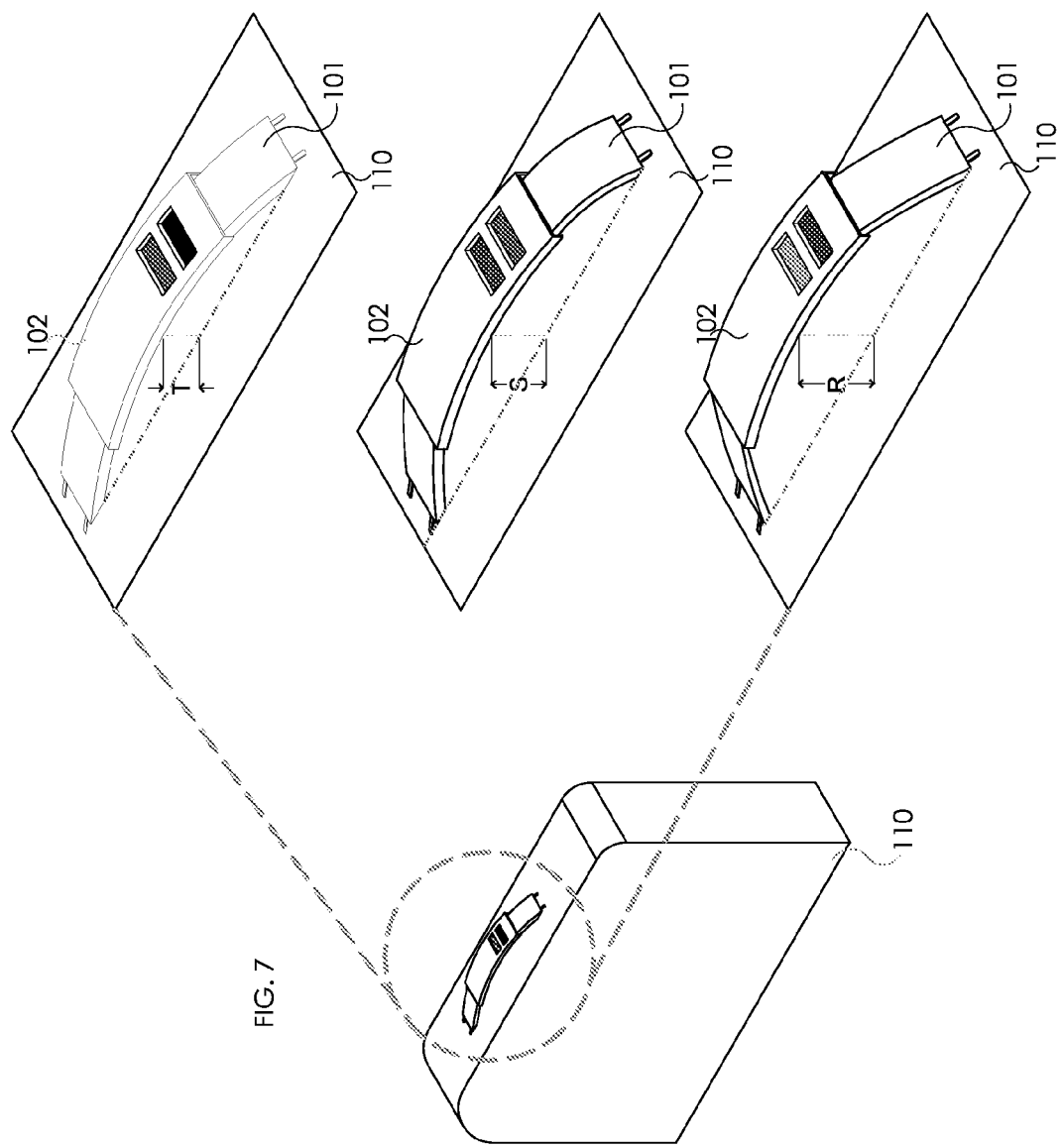
FIG. 7 illustrates a perspective view of a handle integrated scale shown coupled to a liftable element at different intervals from the liftable element.

A handle integrated scale will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

FIG. 1 illustrates a perspective view of handle integrated scale 100. Hand integrated scale 100 includes strap 101 coupled with gauge 102 wherein strap 101 attaches to both sides of liftable element 110, for example a suitcase. Strap 101 may include para-aramid synthetic fiber, such as KEVLAR®, leather, plastic, polyester, polyvinyl chloride "PVC", nylon, styrene, rubber, steel, steel composite, carbon fiber, or any other object that may support liftable element 110 for example.

FIG. 2A illustrates a top view of a handle integrated scale that includes an elastic force detector shown without a gauge. Strap 101 includes one or more force indicators such as force indicators 201, 202 and 203, which for example may be implemented with different colors, and further includes force detector 210a, and slack 220. As liftable element 110 is lifted by applying force upwardly to strap 101, force detector 210a extends until slack 220 is all taken up and is in line with strap 101 and force detector 210a reaches its maximum length.

Force indicators may include a series of colored elements for example. Other embodiments may use numerical or texture based indicators for the blind for example. Force detector 201a may include one or more elastic band, a rubber band, latex band or any other element that stretches as a result of a longitudinal force for example.

FIG. 2B illustrates a top view of a handle integrated scale that includes a spring coiled force detector shown without a gauge. Strap 101 includes force indicators 201, 202 and 203, which for example may be implemented with different colors, and further includes force detector 210b, and slack 220. As liftable element 110 is lifted by applying force upwardly to strap 101, force detector 210b extends until slack 220 is all taken up and is in line with strap 101 and force detector 210b reaches its maximum length. Force detector 20 lb may include one or more coiled spring, torsion spring or any other element that stretches as a result of a longitudinal force for example.

FIG. 3 illustrates a top view of a handle integrated scale shown with gauge 102. As shown, gauge 102 includes gauge value 301 and gauge value 302, for example implemented as slots in gauge 102 that allow the color indicators 201-203 to show through when liftable element 110 is lifted and as force detector 210 stretches or otherwise extends.

FIG. 4A illustrates a top view of handle integrated scale 100 shown with an outline of where gauge 102 (shown as dotted lines) would be placed in relation to said hand integrated scale 100 that includes elastic force detector 210a. Force indicators 201-203 are displayed through gauge value 301 and gauge value 302 as liftable element 110 is lifted and as force detector 210 stretches.

FIG. 4B illustrates a top view of handle integrated scale 100 shown with an outline of where gauge 102 (shown as dotted lines) would be placed in relation to said hand integrated scale 100 that includes spring coiled force detector 210b. Force indicators 201-203 are displayed through gauge value 301 and gauge value 302 as liftable element 110 is lifted and as force detector 210 stretches.

FIG. 5A illustrates a perspective view of handle integrated scale 100 shown with slack 220 in relation to elastic force detector 210a. Force detector 210A will only stretch as far as length Y of slack 220.

FIG. 5B illustrates a perspective view of handle integrated scale 100 shown with slack 220 in relation to spring coiled force detector 210b. Force detector 210b will only stretch as far as length Y of slack 220.

FIGS. 6A, 6B and 6C illustrate a top view of a handle integrated scale shown with the gauge placed in three different positions based on the position of the force indictor relative to the gauge. FIG. 6A illustrates force indicator 201 viewable through gauge value 301 as liftable element 110 is at rest and no upward force is exerted onto hand integrated scale 100, and the length value of strap 101 is "z". FIG. 6B illustrates force indicator 202 viewable through gauge value 301 and force indicator 201 viewable through gauge value 302 as upward force is exerted onto hand integrated scale 100 in an attempt to pick up liftable element 110, and strap 101 begins to lengthen as force detector stretches by value "x". FIG. 6C illustrates force indicator 203 viewable through gauge value 301 and force indicator 202 viewable through gauge value 302 as upward force is exerted onto hand integrated scale 100, and strap 101 stretches by two values of "x" wherein the entire slack has been used up.

FIG. 7 illustrates a perspective view of a handle integrated scale shown coupled to a liftable element at different intervals from the liftable element. Value "T" is the vertical distance between integrated hand scale 100 and liftable element 110 while liftable element 110 is at rest as in FIG. 6A. Value "S" illustrates the vertical distance between integrated hand scale 100 and liftable element 110 as upward force is exerted onto hand integrated scale and strap 101 lengthens as in FIG. 6B. Value "R" illustrates the distance between integrated hand scale 100 and liftable element 110 as upward force is exerted into hand integrated hand scale 100 and strap 101 lengthens as in FIG. 6C.

While the ideas herein disclosed has been described by means of specific embodiments and applications thereof, numerous modifications and variations could be made thereto by those skilled in the art without departing from the scope of the invention set forth in the claims.

What is claimed is:

1. A luggage handle integrated scale comprising:
   a strap having two ends wherein each end is attached to a luggage container,
   a force detector having a first end and a second end wherein said first end and said second end are each coupled with said strap;
   a force indicator coupled with said strap wherein said force indicator is configured as an elastic band with different colored bars associated with said force detector;
   said strap configured with slack between said first end of said force detector and said second end of said force detector wherein said strap is configured to limit maximum extension of said force detector to a length of said slack;
   said strap configured to support said luggage container if said force detector breaks; and
   a gauge configured to couple with said strap wherein said gauge comprises slot-shaped holes configured to allow one or more of said colored bars to be displayed based on a force imparted to said force detector based on a weight of said luggage container.

2. The handle integrated scale of claim 1 wherein said gauge is configured to fit around said force indicator, said strap, and said force detector.

3. The handle integrated scale of claim 1 wherein said strap is constructed from para-aramid synthetic fiber or leather or plastic or polyester or PVC.

4. The handle integrated scale of claim 1 wherein said strap is constructed from nylon.

5. The handle integrated scale of claim 1 wherein said strap is constructed from styrene.

6. The handle integrated scale of claim 1 wherein said strap is constructed from rubber.

7. The handle integrated scale of claim 1 wherein said strap is constructed from steel.

8. The handle integrated scale of claim 1 wherein said strap is constructed from steel composite.

9. The handle integrated scale of claim 1 wherein said strap is constructed from carbon fiber.

10. The handle integrated scale of claim 1 wherein said force detector is an elastic band.

11. The handle integrated scale of claim 1 wherein said force detector is a rubber band.

12. The handle integrated scale of claim 1 wherein said force detector is a latex band.

13. The handle integrated scale of claim 1 wherein said force detector is a spring.

14. The handle integrated scale of claim 1 wherein said force detector is a coiled spring or torsion spring.

15. The handle integrated scale of claim 1 wherein said gauge is further configured to be placed in different positions based on different positions of said at least one force indicator relative to said gauge.

16. The handle integrated scale of claim 15, wherein said different positions comprise a first position, a second position and a third position and wherein said at least one force indicator comprises a first force indicator, a second force indicator and a third force indicator, such that said first position comprises said first force indicator configured to display said value as said liftable element is at rest at a first vertical distance and no upward force is exerted, said second position comprises said second force indicator configured to display said value as upward force is exerted and said strap begins to lengthen as said force detector stretches by a first value at a second vertical distance, and said third position comprises said third force indicator configured to display said value as upward force is exerted and said strap stretches by two values of said first value and said slack has been entirely used up at a third vertical distance.

17. A method for manufacturing a luggage handle integrated scale comprising:

coupling a strap having two ends wherein each end is attached to a luggage container;

coupling a force detector having a first end and a second end with said strap;

coupling a force indicator with said strap wherein said force indicator is configured as an elastic band with different colored bars associated with said force detector;

configuring said strap with slack between said first end of said force detector and said second end of said force detector wherein said strap is configured to limit maximum extension of said force detector to a length of said slack;

configuring said strap to support said luggage container if said force detector breaks; and coupling a gauge with said strap wherein said gauge comprises slot-shaped holes configured to allow one or more of said colored bars to be displayed based on a force imparted to said force detector based on a weight of said luggage container.

18. The method for manufacturing a handle integrated scale of claim 17 wherein said gauge is further configured to be placed in different positions based on different positions of said at least one force indicator relative to said gauge.

19. The method for manufacturing a handle integrated scale of claim 18, wherein said different positions comprise a first position, a second position and a third position and wherein said at least one force indicator comprises a first force indicator, a second force indicator and a third force indicator, such that said first position comprises said first force indicator configured to display said value as said liftable element is at rest at a first vertical distance and no upward force is exerted, said second position comprises said second force indicator configured to display said value as upward force is exerted and said strap begins to lengthen as said force detector stretches by a first value at a second vertical distance, and said third position comprises said third force indicator configured to display said value as upward force is exerted and said strap stretches by two values of said first value and said slack has been entirely used up at a third vertical distance.

\* \* \* \* \*